(12) United States Patent
Coombs et al.

(10) Patent No.: US 12,036,823 B2
(45) Date of Patent: Jul. 16, 2024

(54) TIRE INFLATION SYSTEM AND CONNECTION ARRANGEMENT

(71) Applicant: ArvinMeritor Technology, LLC, Troy, MI (US)

(72) Inventors: Joshua Coombs, East Lansing, MI (US); Brian Vinson, Howell, MI (US); Gary Meyers, South Lyon, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 211 days.

(21) Appl. No.: 17/570,716

(22) Filed: Jan. 7, 2022

(65) Prior Publication Data

US 2023/0219380 A1  Jul. 13, 2023

(51) Int. Cl.
*B60C 23/00* (2006.01)
*F16L 27/08* (2006.01)

(52) U.S. Cl.
CPC .... *B60C 23/00345* (2020.05); *F16L 27/0849* (2013.01)

(58) Field of Classification Search
CPC ............ B60C 23/00345; B60C 23/007; B60C 23/00318; F16L 27/0849
See application file for complete search history.

(56) References Cited

U.S. PATENT DOCUMENTS

| | | |
|---|---|---|
| 3,100,655 A | 8/1963 | Work |
| 4,932,451 A | 6/1990 | Williams et al. |
| 5,287,906 A | 2/1994 | Stech |
| 6,105,645 A | 8/2000 | Ingram |
| 6,145,559 A * | 11/2000 | Ingram, II ........ B60C 23/00354 152/417 |
| 6,435,238 B1 | 8/2002 | Hennig |
| 6,585,019 B1 | 7/2003 | Ingram |
| 6,968,882 B2 | 11/2005 | Ingram |
| 7,302,980 B2 | 12/2007 | Ingram |
| 7,416,005 B2 | 8/2008 | Hennig et al. |
| 7,418,989 B2 | 9/2008 | Ingram |
| 7,530,379 B1 * | 5/2009 | Becker ............. B60C 23/00318 152/416 |
| 7,896,045 B2 | 3/2011 | Solie et al. |
| 7,963,159 B2 | 6/2011 | Ingram et al. |
| 7,975,739 B1 | 7/2011 | Ingram |
| 8,028,732 B1 | 10/2011 | Ingram et al. |

(Continued)

FOREIGN PATENT DOCUMENTS

DE  102016014869 A1  6/2017
WO  2017040802 A1  3/2017

OTHER PUBLICATIONS

Extended European Search Report dated May 17, 2023 for European Appln. No. 23150175.0; 9 Pages.

(Continued)

*Primary Examiner* — Patrick C Williams
(74) *Attorney, Agent, or Firm* — Brooks Kushman PC

(57) ABSTRACT

A connection arrangement for a tire inflation system. The connection arrangement includes a rotary union and a hose assembly. A main body of the hose assembly is insertable into and removeable from a receptacle cavity of the rotary union when in a first rotational position. A locking protrusion of the hose assembly is received in the locking opening of the rotary union to secure the main body to the rotary union when in the second rotational position.

20 Claims, 9 Drawing Sheets

(56) References Cited

U.S. PATENT DOCUMENTS

| | | |
|---|---|---|
| 8,505,600 B2 | 8/2013 | Padula et al. |
| 9,132,704 B2 * | 9/2015 | Wilson .............. B60C 23/00354 |
| 9,221,395 B2 | 12/2015 | Honig et al. |
| 9,278,587 B2 | 3/2016 | Honig |
| 9,283,818 B2 | 3/2016 | Kenney et al. |
| 9,291,294 B2 * | 3/2016 | Lehmann .............. F16L 37/113 |
| 9,315,077 B2 | 4/2016 | Flory et al. |
| 9,333,813 B2 | 5/2016 | Tiziani et al. |
| 9,346,329 B2 | 5/2016 | Keane |
| 9,352,621 B2 | 5/2016 | Morgan |
| 9,409,450 B2 | 8/2016 | Dean et al. |
| 9,452,644 B2 | 9/2016 | Kenney et al. |
| 9,452,645 B2 | 9/2016 | Polubinski et al. |
| 9,481,213 B2 | 11/2016 | Kenney et al. |
| 9,511,635 B2 | 12/2016 | Berkness et al. |
| 9,517,663 B2 | 12/2016 | Lewandowski et al. |
| 9,539,865 B2 | 1/2017 | Lakin et al. |
| 9,561,694 B2 | 2/2017 | Ingram et al. |
| 9,597,931 B2 | 3/2017 | Dean et al. |
| 9,815,340 B2 | 11/2017 | Trostle et al. |
| 9,950,574 B2 | 4/2018 | Berkness et al. |
| 10,005,325 B2 | 6/2018 | Cappello et al. |
| 10,086,660 B1 | 10/2018 | Berkness et al. |
| 10,315,469 B2 | 6/2019 | Coombs |
| 10,343,467 B1 | 7/2019 | Dooley et al. |
| 10,391,824 B2 | 8/2019 | Trostle et al. |
| 10,543,849 B2 | 1/2020 | Jankowski et al. |
| 10,596,862 B1 | 3/2020 | Cappello et al. |
| 10,596,863 B1 | 3/2020 | Castriotta |
| 10,596,864 B1 | 3/2020 | Berkness et al. |
| 10,647,169 B1 | 5/2020 | Castriotta et al. |
| 2004/0238093 A1 | 12/2004 | Nelson et al. |
| 2009/0272443 A1 * | 11/2009 | Lee .......................... F16K 1/306 |
| | | 220/586 |
| 2015/0059947 A1 | 3/2015 | Power et al. |
| 2015/0096655 A1 | 4/2015 | Koulinitch et al. |
| 2016/0288590 A1 | 10/2016 | Hennig et al. |
| 2021/0364039 A1 | 11/2021 | Shah et al. |

OTHER PUBLICATIONS

Extended European Search Report dated May 16, 2023 for related European Appln. No. 23150075.2; 8 Pages.

Meritor Heavy Vehicle Systems, LLC, "Meritor Tire Inflation System (MTIS) by PSI including Meritor ThermALERT" [PB-9999 Revised May 2007], 12 Pages.

Kannatti et al., U.S. Appl. No. 17/154,031, filed Jan. 21, 2021; 29 Pages.

Shah et al., U.S. Appl. No. 16/991,869, filed Aug. 12, 2020; 25 Pages.

Australian Examination Report dated Feb. 5, 2024 for Australian Appln. No. 2022291616; 4 Pages.

* cited by examiner

TIRE INFLATION SYSTEM AND CONNECTION ARRANGEMENT

TECHNICAL FIELD

This invention relates to a tire inflation system for a vehicle and a connection arrangement of the tire inflation system.

BACKGROUND

A rotary union for a tire inflation system is disclosed in U.S. Patent Publication No. 2016/0288590.

SUMMARY

In at least one configuration a connection arrangement for a tire inflation system is provided. The connection arrangement includes a rotary union and at least one hose assembly. The rotary union has a rotatable fitting that is rotatable about an axis with a hub cap. The rotatable fitting includes a mounting portion and a receptacle. The mounting portion is mountable to the hub cap. The receptacle is fluidly connected to the mounting portion and includes a receptacle wall and a locking opening. The receptacle wall extends away from the mounting portion and extends around a receptacle axis to define a receptacle cavity. The locking opening is provided in the receptacle wall. The hose assembly includes a main body and a hose. The main body is receivable in the receptacle cavity and has a first end, a second end, a main passage, a locking protrusion, and a port. The main passage extends from the first end to the second end. The locking protrusion is disposed opposite the main passage and extends away from the main passage. The port extends along a port axis and is fluidly connected to the main passage. The hose is coupled to the main body and is adapted to be fluidly connected to a tire. The main body is rotatable between a first rotational position and a second rotational position when the main body is received in the receptacle cavity. The main body is insertable into and removeable from the receptacle cavity in the first rotational position. The locking protrusion is received in the locking opening to secure the main body to the receptacle when in the second rotational position. The port may be aligned with the hub cap in the second rotational position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
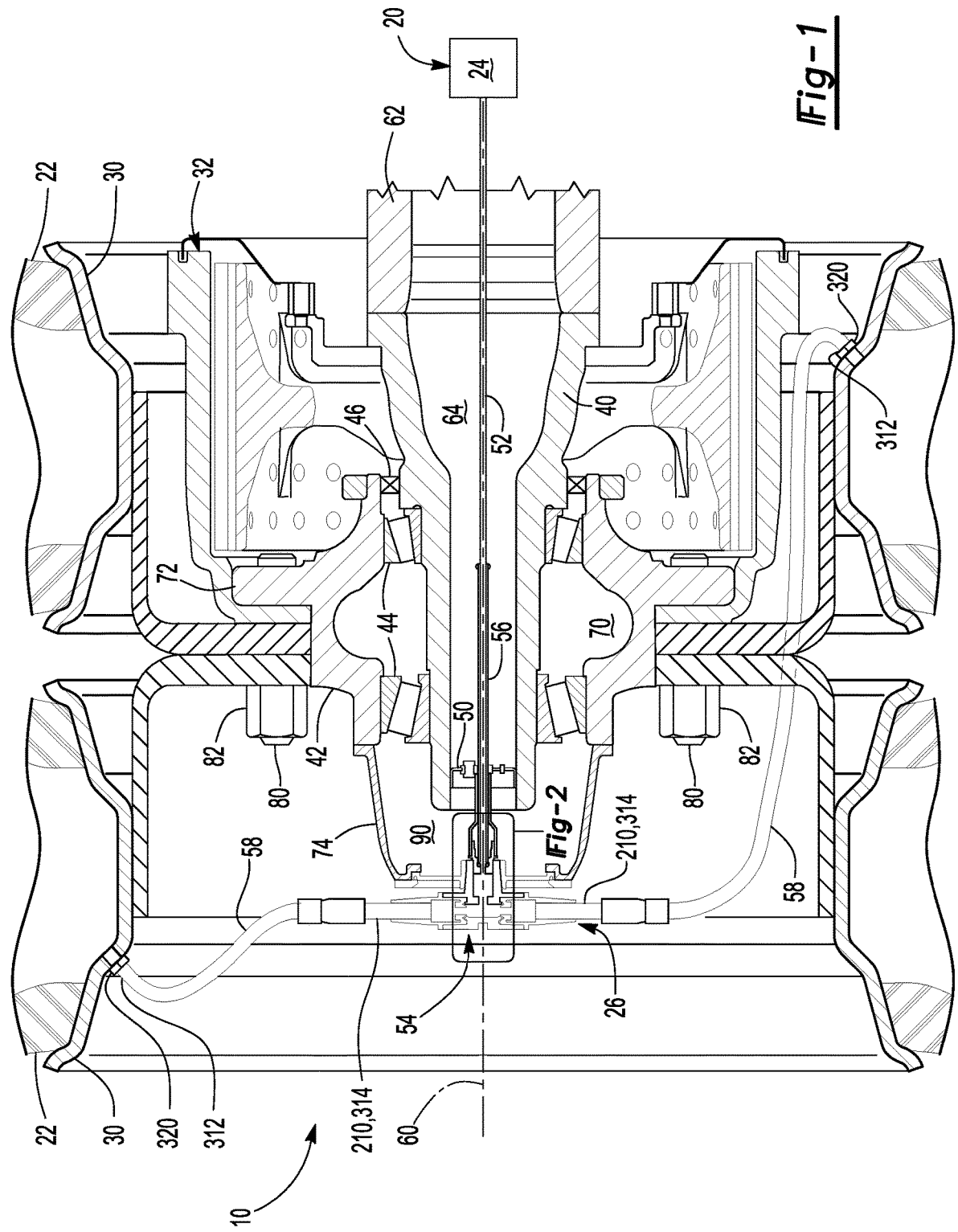
FIG. 1 is a section view of a wheel end of an axle assembly.

Referring to FIG. 1, a portion of an axle assembly 10 is shown. The axle assembly 10 may be provided with a vehicle like a truck, bus, farm equipment, mining equipment, military transport or weaponry vehicle, cargo loading equipment for land, air, or marine vessels, or a trailer for transporting cargo.

As an overview, the axle assembly 10 may be associated with a tire inflation system 20 that may help obtain and/or maintain a desired pressure within one or more tires 22. The tire inflation system 20 may be disposed on the vehicle and may be configured to provide a pressurized gas or pressurized gas mixture to one or more tires 22, exhaust the pressurized gas or pressurized gas mixture from one or more tires 22, or both. For clarity, the term "pressurized gas" may refer to a pressurized gas mixture (e.g., air) or a purified pressurized gas or gas mixture (e.g., nitrogen). For convenience in reference, the term "air" is used below as a generic designator that is not intended to be limiting to a particular pressurized gas or gas mixture (e.g., an "air passage" may facilitate the flow of a pressurized gas other than air). Tire inflation or deflation may be desired when the tire pressure is not sufficiently close to the tire pressure specified by the vehicle manufacturer and/or is inappropriate for the type of ground over which a vehicle is travelling. For instance, higher tire pressures may be desired when a vehicle is travelling on a paved road as compared to when a vehicle is travelling off-road.

The tire inflation system 20 may be fluidly connected to a pressurized gas source 24. The pressurized gas source 24 may be configured to supply or store a volume of a pressurized gas. For example, the pressurized gas source 24 may be a tank, a pump like a compressor, or combinations thereof. The pressurized gas source 24 may be configured to provide pressurized gas at a pressure that is greater than or equal to a desired inflation pressure of a tire 22. The pressurized gas source 24 may be disposed on the vehicle and may be fluidly connected to at least one tire 22 via passages in various components, such as via a connection arrangement 26 that may include a hose assembly that fluidly connects a rotary union to a tire 22 as will be discussed in more detail below.

The axle assembly 10 may be configured to support one or more wheels 30. The axle assembly also be configured to support a brake assembly 32, such as a friction brake like a disc brake or drum brake. The axle assembly 10 may be provided in a steerable configuration or a non-steerable configuration. In a steerable configuration, the axle assembly 10 may be a steerable structural component, such as a steering knuckle. In at least one configuration, the axle assembly 10 may include a spindle 40, a hub 42, one or more wheel bearings 44, and a hub seal 46. The axle assembly may also include a spindle plug 50, a hose 52, a rotary union 54, a sleeve 56, and one or more hose assemblies 58.

The spindle 40 may be disposed along or may extend around an axis 60. The spindle 40 may be fixedly positioned with respect to a structural component 62, such as a steering knuckle or an axle housing. It is contemplated that the spindle 40 may be integrally formed with the structural component 62 rather than being a separate part from the structural component 62. In at least one configuration, the spindle 40 may define a spindle hole 64.

The spindle hole 64 may be disposed along the axis 60. The spindle hole 64 may be a through hole that may extend through the spindle 40. The spindle hole 64 may receive various components, such as the spindle plug 50, the hose 52, and the sleeve 56. In a drive axle configuration, the spindle hole 64 may also receive an axle shaft that may operatively connect a power source or torque source such as an engine or electric motor to the hub 42 to help propel the vehicle.

The hub 42 may be rotatable about the axis 60 with respect to the spindle 40. In addition, the hub 42 may facilitate mounting of at least one wheel 30. In at least one configuration, the hub 42 may include a hub cavity 70, a hub mounting flange 72, and a hub cap 74.

The hub cavity 70 may be disposed inside the hub 42 and may be encircled by the hub 42. As such, the hub cavity 70 may extend around the axis 60. The hub cavity 70 may receive at least a portion of various components of the axle assembly 10, such as the spindle 40, one or more wheel bearings 44, and the hub seal 46.

The hub mounting flange 72 may facilitate mounting of at least one wheel 30. For example, the hub mounting flange 72 may extend around the axis 60 and away from the axis 60 and may include a set of mounting fastener holes that may each receive a mounting lug bolt 80. A mounting lug bolt 80 may extend through a corresponding hole in a wheel 30. A lug nut 82 may be threaded onto a mounting lug bolt 80 to secure a wheel 30 to the hub 42. In the configuration shown in FIG. 1, two wheels 30 are illustrated that each support a corresponding tire 22; however, it is contemplated that a single wheel 30 and tire 22 may be provided.

The hub cap 74 may be disposed proximate an outboard end of the hub 42. The hub cap 74 may help enclose the hub cavity 70. In at least one configuration, the hub cap 74 define a hub cap cavity 90 that may receive at least a portion of the rotary union 54.

One or more wheel bearings 44 may be disposed on the spindle 40 and may rotatably support the hub 42. In the configuration shown, two wheel bearings 44 are illustrated. A wheel bearing 44 may have any suitable configuration. For instance, a wheel bearing 44 may include a plurality of rolling elements, such as balls or rollers, that may be disposed between an inner race and an outer race. The inner race may encircle and may engage the spindle 40. The outer race may engage the hub 42 and may extend around the inner race.

The hub seal 46 may extend from the spindle 40 to the hub 42. The hub seal 46 may be disposed near an inboard end of the hub 42 that may be disposed opposite the hub cap 74. The hub 42, hub seal 46, and the hub cap 74 may cooperate to inhibit contaminants from entering the hub cavity 70.

The spindle plug 50 may be disposed in the spindle hole 64. The spindle plug 50 may be fixedly positioned with respect to the spindle 40. As such, the spindle plug 50 may not rotate about the axis 60 with respect to the spindle 40. The spindle plug 50 may be made of one or more components. In at least one configuration, the spindle plug 50 may include an opening through which the hose 52 and the sleeve 56 may extend.

The hose 52 may fluidly connect the pressurized gas source 24 to the rotary union 54. In at least one configuration, the hose 52 or a portion thereof may extend along the axis 60. The hose 52 may be made of any suitable material, such as a polymeric material. The hose 52 may be fluidly coupled to a hose fitting that may be provided with a through hole in the axle assembly to facilitate a fluid connection to the pressurized gas source 24. As such, one end of the hose 52 may be mounted to a portion of the axle assembly such as the spindle or axle housing while the other end may be mounted to or fluidly connected to the rotary union 54.

The rotary union 54 may be configured to fluidly connect the hose 52 to one or more hose assemblies 58. The connection arrangement 26 may include the rotary union 54 and one or more hose assemblies 58. In at least one configuration and as is best shown with reference to FIG. 2, the rotary union 54 may include a torque tube 100, a stator 102, a hose retainer 104, and a rotatable fitting 106.

Figure 2:
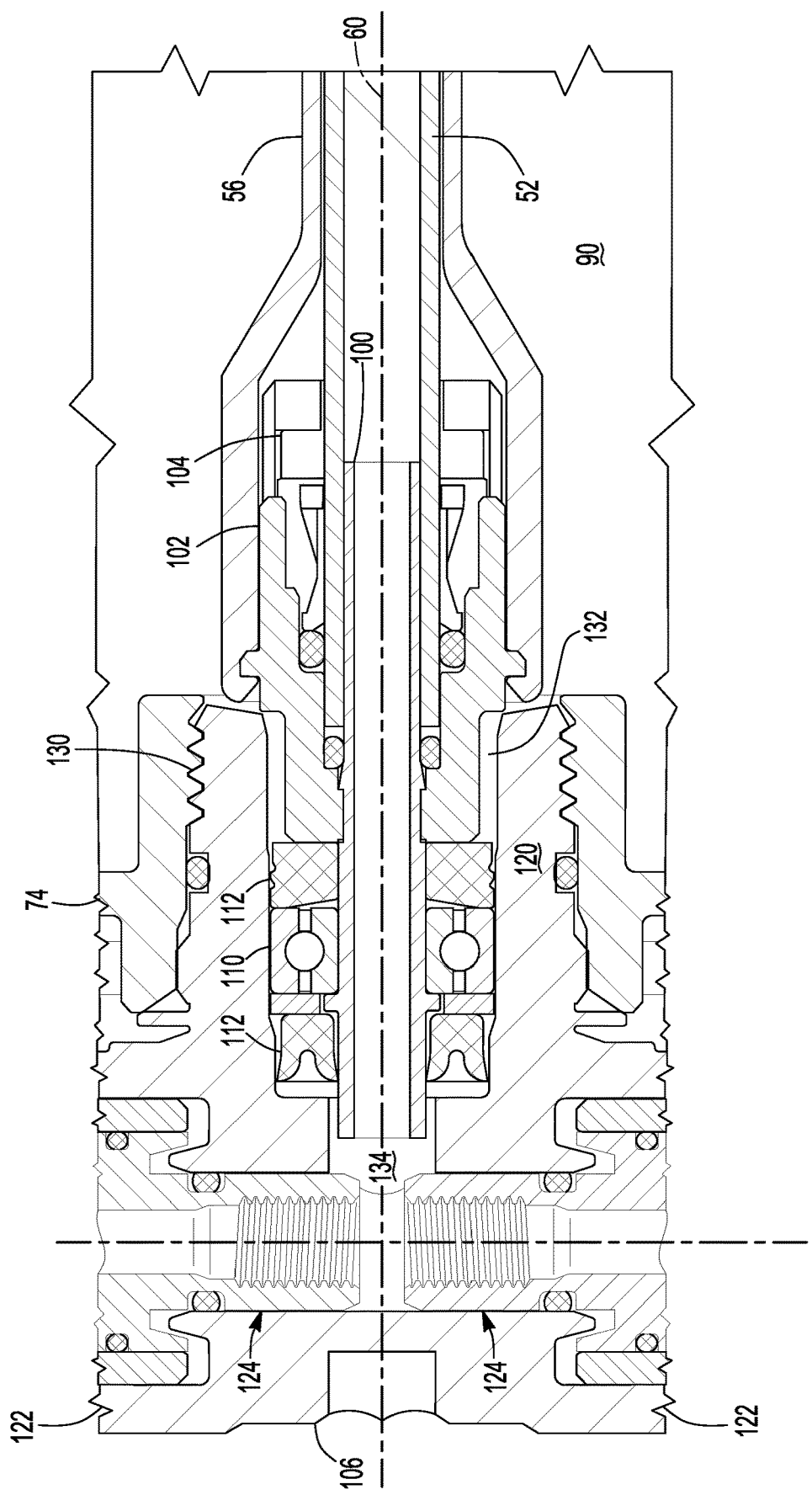
FIG. 2 is a magnified view of a portion of FIG. 1.

The torque tube 100 may be a hollow tube that may be disposed along the axis 60. The torque tube 100 may have a first end and a second end. The first end may be fluidly connected to the hose 52. For instance, the first end may engage or contact the hose 52. In FIG. 2, the hose 52 is received inside of the hose 52; however, it is contemplated that this arrangement may be reversed. The second end may be disposed opposite the first end. For example, the second end may face toward and may be received inside the rotatable fitting 106. As such, the torque tube 100 may provide a fluid connection between the hose 52 and the rotatable fitting 106. In at least one configuration, the torque tube 100 may be mounted to the stator 102 such that the torque tube 100 does not rotate with respect to the stator 102.

The stator 102 may extend from the torque tube 100 in a direction that extends toward the spindle plug 50. The stator 102 may be received inside of the hub cap cavity 90 and may be spaced apart from the rotatable fitting 106. The torque tube 100 may engage the hose 52 inside the stator 102. The sleeve 56 may be mounted to the stator 102.

Referring to FIGS. 1 and 2, the sleeve 56 may cooperate with the spindle plug 50 to limit rotation of the stator 102 and the hose 52 about the axis 60. The sleeve 56 may receive or encircle the hose 52 and may extend from the spindle plug 50 to the stator 102 of the rotary union 54.

Referring to FIG. 2, the hose retainer 104 may help secure the hose 52 to the stator 102. The hose retainer 104 may encircle the hose 52 and may be at least partially received inside of the stator 102.

Figure 3:
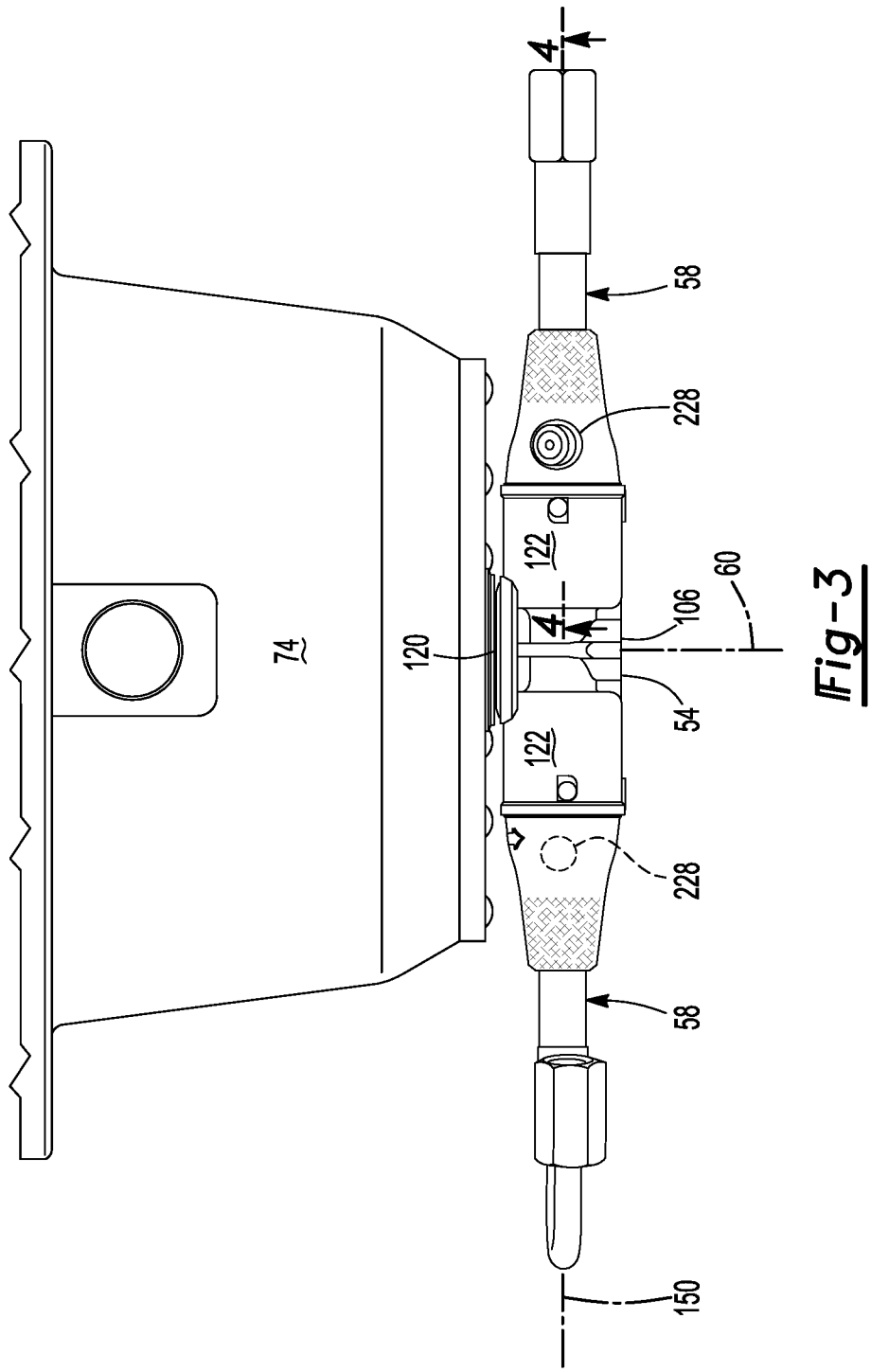
FIG. 3 is a side view of a portion of the axle assembly of FIG. 1 that includes a rotary union and portions of hose assemblies mounted to the rotary union.

Referring primarily to FIGS. 2 and 3, the rotatable fitting 106, which may also be called a tee fitting, may be rotatable about the axis 60 with the hub 42. In addition, the rotatable fitting 106 may be spaced apart from and rotatable with respect to the hose 52, the sleeve 56, the torque tube 100, and the stator 102. For instance, as is best shown in FIG. 2 a bearing 110 may extend from the torque tube 100 to the rotatable fitting 106 to facilitate rotation of the rotatable fitting 106 with respect to the torque tube 100 and the stator 102. One or more seals 112 may also extend from the torque tube 100 to the rotatable fitting 106 to help inhibit the leakage of pressurized gas. In the configuration shown, seals 112 encircle the torque tube 100 and are axially positioned on opposite sides of the bearing 110. As such, the rotatable fitting 106 may be rotatable about the axis 60 with respect to the torque tube 100 and the stator 102.

The rotatable fitting 106 may fluidly connect the torque tube 100 to one or more hose assemblies 58. In at least one configuration, the rotatable fitting 106 may include a mounting portion 120, at least one receptacle 122, and a receptacle passage 124.

Figure 5:
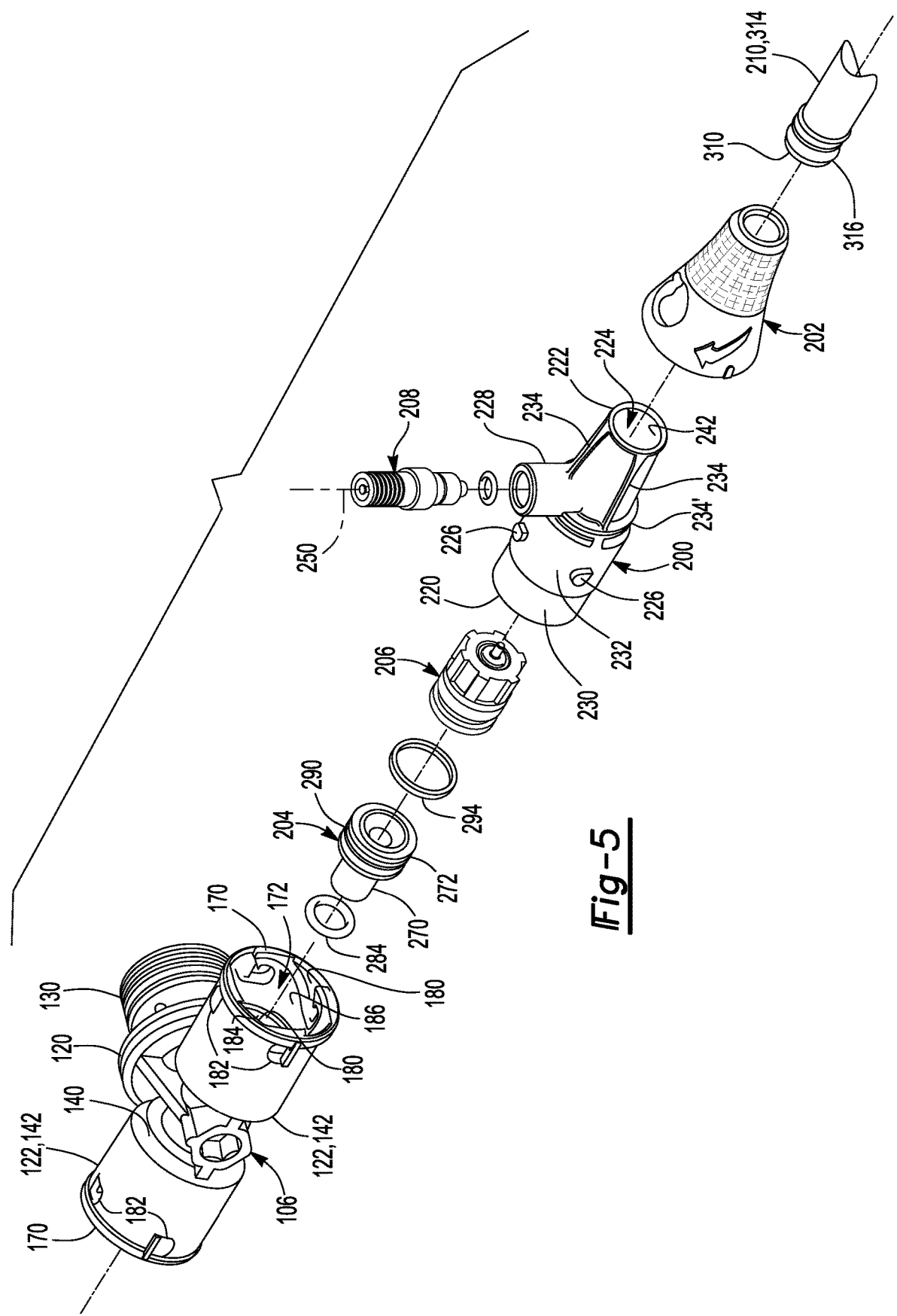
FIG. 5 is an exploded view of a portion of the rotary union and a hose assembly.

Referring primarily to FIGS. 2 and 5, the mounting portion 120 may facilitate mounting of the rotatable fitting 106 to the hub cap 74. The mounting portion 120 may be mounted to the hub cap 74 in any suitable manner. For instance, the mounting portion 120 may include a threaded portion 130 that may mate with a corresponding threaded portion of the hub cap 74. The mounting portion 120 may extend around and may encircle the axis 60 and may define a cavity 132 and a passage 134, which are best shown in FIG. 2.

The cavity 132 may be disposed inside the mounting portion 120. The cavity 132 may be open in a direction that faces toward the stator 102. The cavity 132 may receive a portion of the torque tube 100, a portion of the stator 102, the bearing 110, and one or more seals 112.

The passage 134 may fluidly connect the cavity 132 to one or more receptacle passages 124. The passage 134 may be configured as a through hole that may extend through and end wall of the mounting portion 120 that is disposed adjacent to a receptacle 122.

Figure 4:
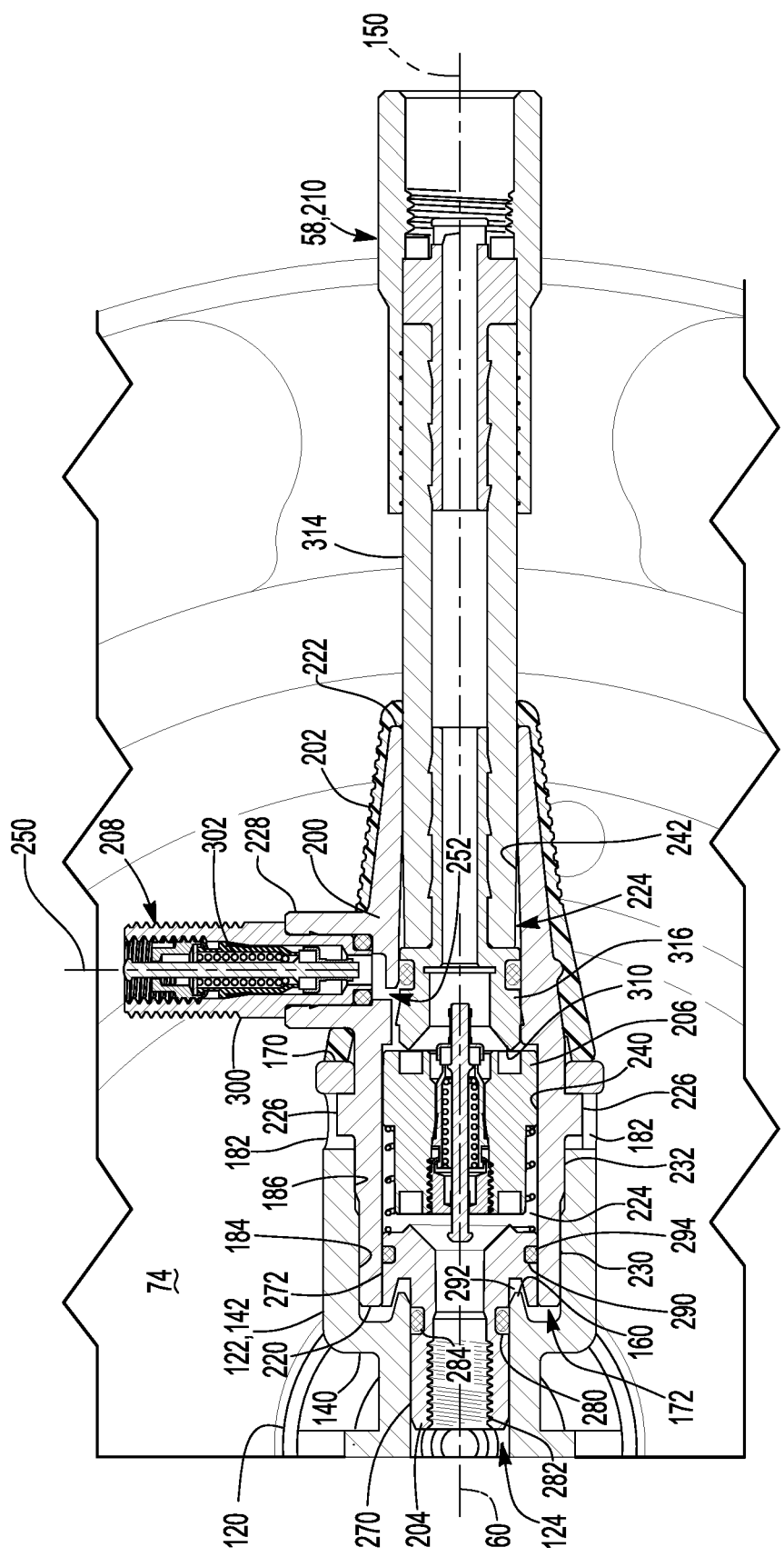
FIG. 4 is a section view along section line 4-4.

Referring primarily to FIGS. 3-5, the receptacle 122 may be fluidly connected to the mounting portion 120. In addition, the receptacle 122 may facilitate mounting of a hose assembly 58 to the rotatable fitting 106. The receptacle 122 may be disposed at an angle with respect to the mounting portion 120. For instance, the receptacle 122 may be disposed substantially perpendicular to the mounting portion 120. The term "substantially perpendicular" is used herein to designate features or axes that are the same as or very close to perpendicular and includes features that are within ±2.5° of being perpendicular each other. In at least one configuration and as is best shown in FIGS. 4 and 5, the receptacle 122 may include a receptacle bottom wall 140 and a receptacle wall 142. Optionally, the receptacle 122 may include a first alignment feature 146.

The receptacle bottom wall 140 may be disposed proximate an end of the receptacle 122 that may be disposed closest to the axis 60. The receptacle bottom wall 140 may encircle a portion of the receptacle passage 124 and a receptacle axis 150 along which the receptacle passage 124 may extend. The receptacle axis 150 may intersect the axis 60, may be disposed substantially perpendicular to the axis 60, or both. In at least one configuration, the receptacle bottom wall 140 may include or may define a ring 160, which is best shown in FIG. 4.

The ring 160 may extend around the receptacle axis 150. The ring 160 may be disposed inside the receptacle 122 and may protrude from the receptacle bottom wall 140 in a direction that extends away from the mounting portion 120, or to the right from the perspective shown in FIG. 4. The ring 160 may be partially received inside an end fitting of the hose assembly 58 as will be discussed in more detail below.

Referring to FIGS. 4 and 5, the receptacle wall 142 may extend away from the mounting portion 120. For instance, the receptacle wall 142 may extend from the receptacle bottom wall 140 to a receptacle wall end surface 170. The receptacle wall end surface 170 may face away from the mounting portion 120 and may be disposed at an end of the receptacle wall 142. In addition, the receptacle wall 142 may be spaced apart from and may extend around or encircle the receptacle axis 150. The receptacle wall 142 may cooperate with the receptacle bottom wall 140 to define a receptacle cavity 172. In at least one configuration, the receptacle wall 142 may define at least one groove 180 and at least one locking opening 182. In addition, the receptacle wall 142 may be provided with one or more inside diameters, such as a first inside portion 184 and a second inside portion 186.

The receptacle passage 124 may fluidly connect the mounting portion 120 to the receptacle cavity 172. In addition, the receptacle passage 124 may have a smaller diameter than the receptacle cavity 172.

Figure 6:
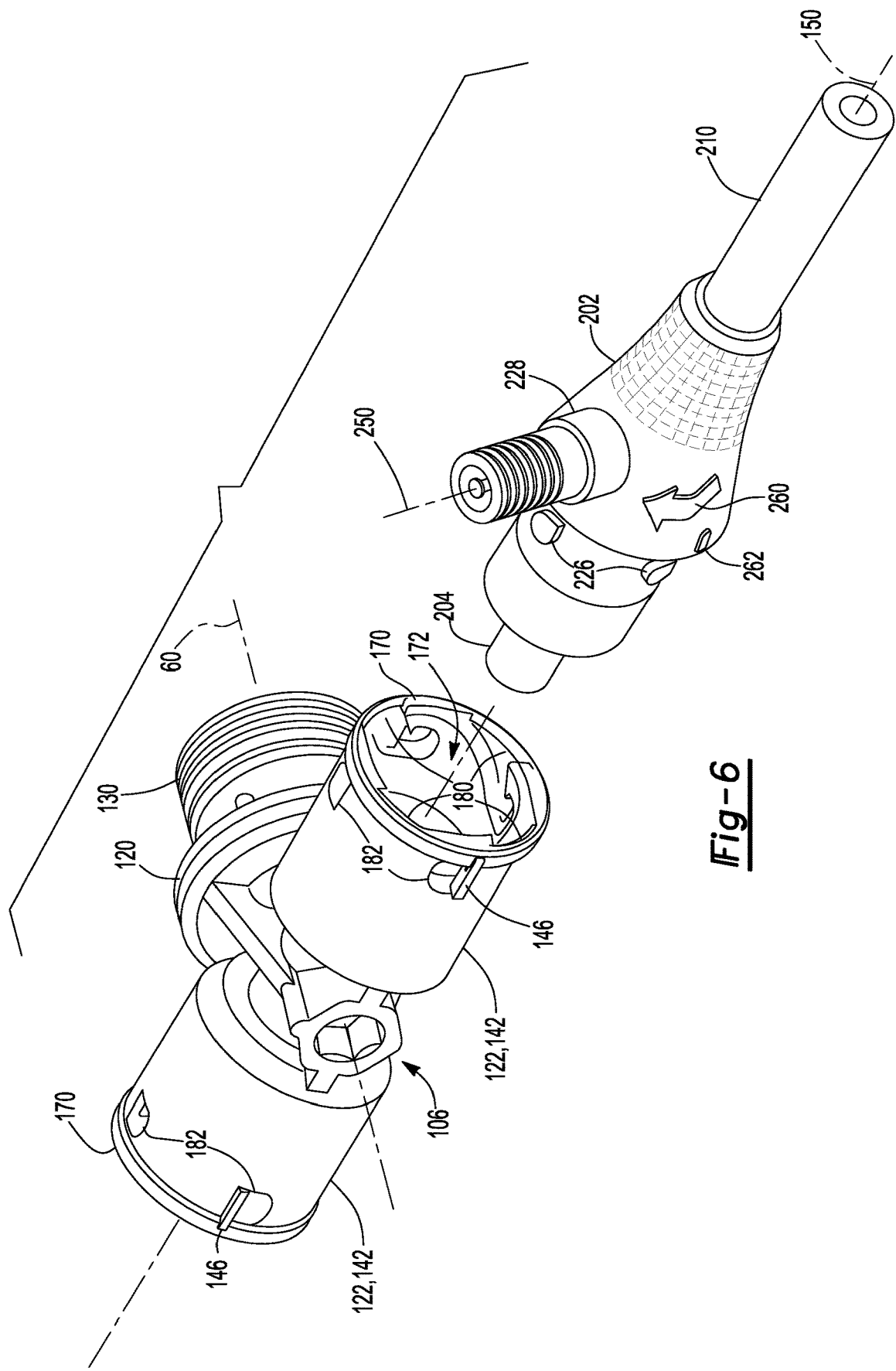
FIG. 6 shows a hose assembly detached and separated from the rotary union.

Referring primarily to FIGS. 5 and 6, one or more grooves 180 may be formed in the receptacle wall 142. In the configuration shown, four grooves 180 are provided; however, it is contemplated that a greater or lesser number of grooves may be provided. A groove 180 may be disposed inside the receptacle 122 such that the groove 180 may extend from an interior side of the receptacle wall 142 away from the receptacle axis 150 and toward an opposing exterior side of the receptacle wall 142. The groove 180 may extend from the receptacle wall end surface 170 toward the mounting portion 120 and the receptacle bottom wall 140. More specifically, a groove 180 may extend from the receptacle wall end surface 170 to a corresponding locking opening 182. The groove 180 may spiral or twist with respect to the receptacle axis 150 as it extends away from the receptacle wall end surface 170. The groove 180 may be tapered such that the groove 180 becomes narrower as the groove 180 extends from the receptacle wall end surface 170 to or toward the locking opening 182.

The locking opening 182 may be provided in the receptacle wall 142. The locking opening 182 may be disposed at an end of the groove 180. In addition, the locking opening 182 may be configured as a through hole that may extend from the interior side to the exterior side of the receptacle wall 142. The locking opening 182 may receive a locking protrusion of the hose assembly 58 to secure the hose assembly 58 to the receptacle 122 as will be discussed in more detail below. In at least one configuration, the locking opening 182 may be generally D-shaped. For instance, the locking opening 182 may have a side that is linear or substantially linear that may be disposed adjacent to the groove 180.

Referring primarily to FIG. 4, the first inside portion 184 may extend around the receptacle axis 150 and may be an inside diameter or inside circumference of at least a portion of the receptacle 122. In at least one configuration, the first inside portion 184 may extend from the receptacle bottom wall 140 in a direction that extends away from the mounting portion 120.

The second inside portion 186 may also extend around the receptacle axis 150 and may also be an inside diameter or inside circumference of a portion of the receptacle 122. The second inside portion 186 may extend between the first inside portion 184 and the receptacle wall end surface 170. The second inside portion 186 may extend further from the receptacle axis 150 or have a larger diameter than the first inside portion 184.

Figure 7:
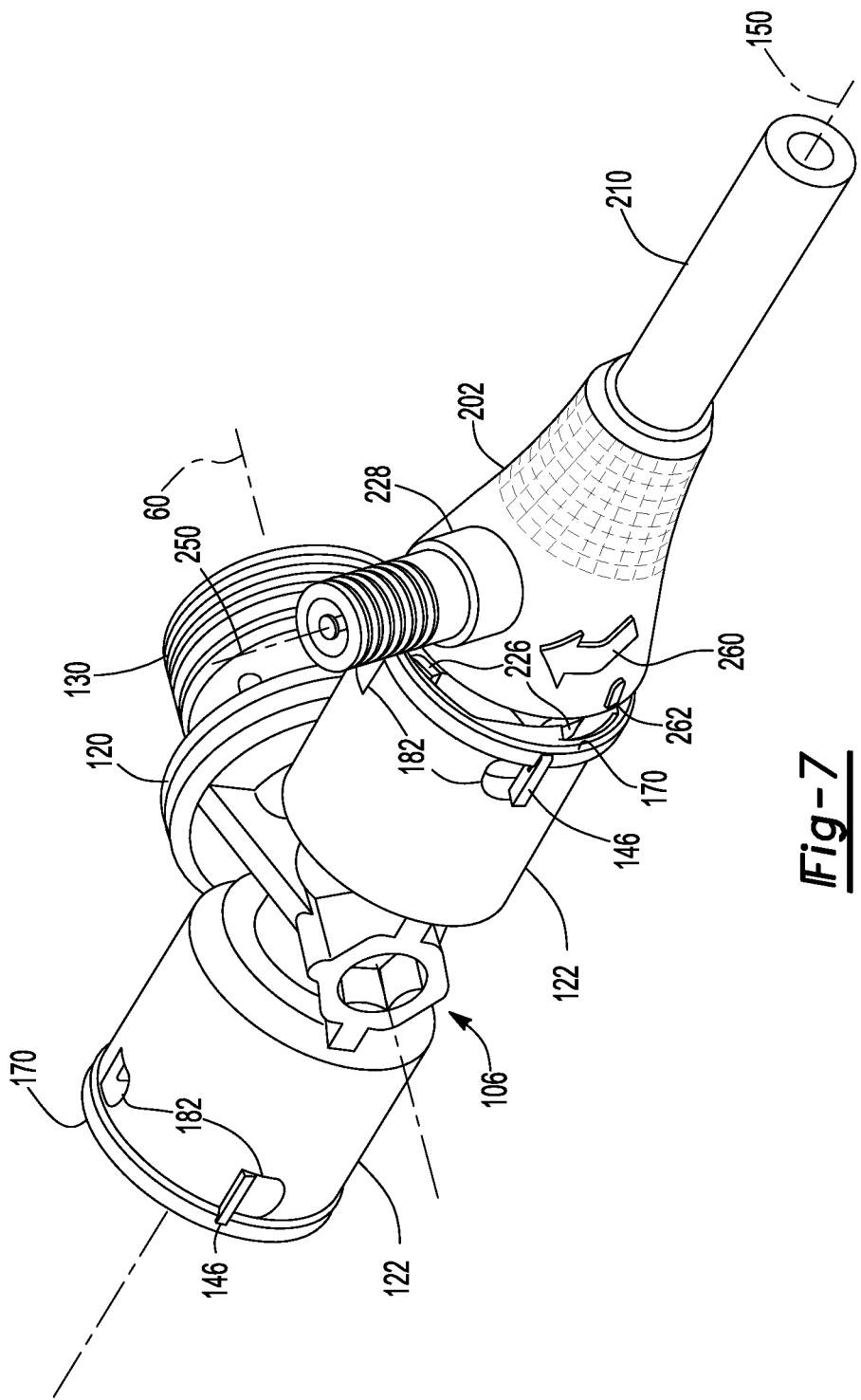
FIG. 7 shows the hose assembly inserted into the rotary union and in a first rotational position.
Figure 8:
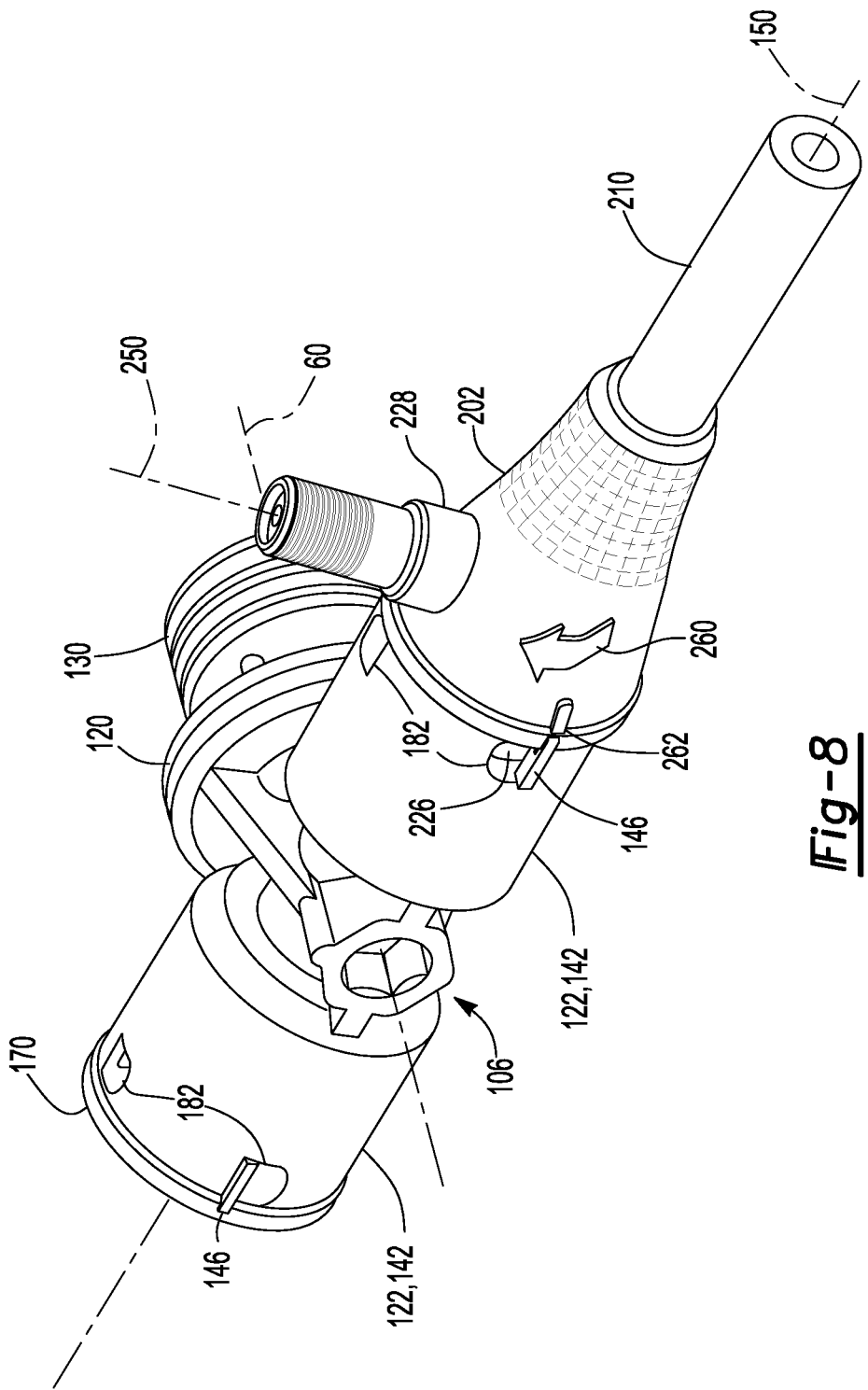
FIG. 8 shows the hose assembly in a second rotational position.

Referring primarily to FIGS. 6-8, the first alignment feature 146 may cooperate with the hose assembly 58 to provide a visual indication of the rotational position of the hose assembly 58 with respect to the receptacle 122 as will be discussed in more detail below. The first alignment feature 146 may have any suitable configuration. For instance, the first alignment feature 146 may protrude from the receptacle 122, be recessed into the receptacle 122, may be flush with the receptacle 122, or combinations thereof. In the configuration shown, the first alignment feature 146 is configured as a protrusion that extends from the exterior side of the receptacle wall 142 in a direction that extends away from the receptacle axis 150. In addition, the first alignment feature 146 is illustrated as extending substantially parallel to the receptacle axis 150. The term "substantially parallel" as used herein means the same as or very close to parallel and includes features or axes that are within ±2.5° of being parallel each other. The first alignment feature 146 may be disposed adjacent to the locking opening 182. For instance, the first alignment feature 146 may be disposed along a generally linear or straight side of the locking opening 182 in one or more configurations.

Referring to FIG. 1, one or more hose assemblies 58 may fluidly connect the rotatable fitting 106 to a corresponding tire 22. In the configuration shown, two hose assemblies 58 are depicted with each hose assembly 58 being fluidly connected to a different tire 22. A single hose assembly 58 may be provided in a configuration having one tire 22 or when the rotatable fitting 106 is provided with a single receptacle 122. In at least one configuration and as is best shown with reference to FIGS. 4 and 5, the hose assembly 58 may include a main body 200, a cover 202, an end fitting 204, a valve assembly 206, a port valve assembly 208, and a hose subassembly 210.

The main body 200 may be selectively coupled to the receptacle 122. For instance, the main body 200 may be insertable into the receptacle cavity 172 and may be rotated about the receptacle axis 150 to couple or decouple the hose assembly 58 to the rotatable fitting 106 as will be discussed in more detail below. The main body 200 may be a unitary one-piece component that may be made of any suitable material, such as a polymeric material. In at least one configuration, the main body 200 may include a first end 220, a second end 222, a main passage 224, one or more locking protrusions 226, and a port 228. Optionally and as is best shown in FIG. 5, the main body 200 may include a first outside portion 230, a second outside portion 232, one or more ribs 234, or combinations thereof.

Referring to FIGS. 4 and 5, the first end 220 may be disposed at a distal end of the main body 200. The first end 220 may be insertable into the receptacle cavity 172.

The second end 222 may be disposed opposite the first end 220. The second end 222 may be disposed outside of the receptacle cavity 172 and may be disposed adjacent to the cover 202 and the hose subassembly 210.

Referring to FIG. 5, the main passage 224 may be configured as a through hole that extend from the first end 220 to the second end 222. The main passage 224 may extend along the receptacle axis 150 when the hose assembly 58 is coupled to the rotatable fitting 106 or when the main body 200 is disposed in the receptacle cavity 172. In at least one configuration and as is best shown in FIG. 5, the main passage 224 may be at least partially defined by a first interior portion 240 and the second interior portion 242.

The first interior portion 240 may be disposed inside the main body 200 and may partially define the main passage 224. The first interior portion 240 may extend from the first end 220 toward the second end 222. The first interior portion 240 may receive a portion of the end fitting 204. The first interior portion 240 may have a larger diameter than the second interior portion 242.

The second interior portion 242 may also be disposed inside the main body 200 and may partially define the main passage 224. The second interior portion 242 may extend from the second end 222 toward or to the first interior portion 240. The second interior portion 242 may receive a portion of the hose subassembly 210.

Referring to FIGS. 4 and 5, one or more locking protrusions 226 may extend from the main body 200. In the configuration shown, four locking protrusions 226 are provided; however it is contemplated that a greater or lesser number of locking protrusions may be provided. A locking protrusion 226 may be disposed on the exterior of the main body 200 such that the locking protrusion 226 may be disposed opposite the main passage 224 and may extend away from the main passage 224. The locking protrusions 226 may be spaced apart from each other. Each locking protrusion 226 may be configured to be received in a corresponding groove 180 of the receptacle 122 during installation of a hose assembly 58 and may be configured to be received in a corresponding locking opening 182 of the receptacle 122 to inhibit rotation of the hose assembly 58 as will be discussed in more detail below.

The port 228 may be axially positioned between the first end 220 and the second end 222 of the main body 200. The port 228 may be disposed outside of the receptacle 122 and may be configured to receive the port valve assembly 208. The port 228 may have any suitable configuration. In the configuration shown, the port 228 has a generally cylindrical configuration that extends from an exterior side of the main body 200 in a direction that extends away from the receptacle axis 150 and the main passage 224. The port 228 may extend along a port axis 250. The port axis 250 may intersect and may be disposed substantially perpendicular to the receptacle axis 150.

Referring to FIG. 4, the port 228 may be fluidly connected to the main passage 224. For example, the port 228 may be fluidly connected to the main passage 224 via a port passage 252 that may be provided with the main body 200. The port passage 252 may be configured as a recess that may be disposed proximate the bottom of the port 228 and that extend toward the receptacle axis 150, a recess that may be disposed in the second interior portion 242 that may extend away from the receptacle axis 150 toward the port 228, or combinations thereof. The port passage 252 may extend axially from the port 228 toward the first end 220.

Referring primarily to FIG. 4, the first outside portion 230 may extend from the first end 220 toward the second end 222. The first outside portion 230 may face toward and may be at least partially encircled by or received in the first inside portion 184 of the receptacle wall 142. The first outside portion 230 may have a smaller outside diameter than the second outside portion 232.

The second outside portion 232 may extend between the first outside portion 230 and the second end 222. For instance, the second outside portion 232 may extend from the first outside portion 232 or toward the port 228. The second outside portion 232 may face toward and may be at least partially encircled by or received in the second inside portion 186 of the receptacle wall 142.

Referring to FIG. 5, one or more ribs 234 may be provided to help secure or inhibit rotation of the cover 202 with respect to the main body 200. A rib 234 may be disposed on the exterior of the main body 200 and may extend between the second end 222 and the first end 220. For instance, one or more ribs 234 may extend axially from the second end 222 toward the first end 220. It is also contemplated that one or more ribs 234' may extend circumferentially around the main body 200 and that a rib 234' may intersect the port 228.

Referring primarily to FIGS. 4 and 5, the cover 202 may extend around and may conceal a portion of the main body 200. For instance, the cover 202 may extend from the second end 222 of the main body 200 toward the first end 220 of the main body 200. The cover 202 may be disposed outside of the receptacle cavity 172 when the hose assembly 58 is mounted to the rotary union 54. The cover 202 may include one or more recesses that may receive a corresponding rib 234, 234'. In addition, the cover 202 may include a plurality of openings. For instance, the cover 202 may include a first opening that may face toward the receptacle 122 and may encircle the second interior portion 242, a second opening that may encircle the hose subassembly 210, and a third opening that may encircle the port 228. The cover 202 may be made of any suitable material, such as a polymeric material or rubber and may be textured to facilitate gripping.

Referring to FIG. 6, the cover 202 may include various markings. For instance, the cover 202 may include one or more rotational markings 260 and a second alignment feature 262.

The rotational marking 260 may be provided on a visible exterior side of the cover 202. The rotational marking 260 may include information regarding the direction in which the main body 200 should be rotated to couple and/or decouple the hose assembly 58 to the rotatable fitting 106. It is also contemplated that the rotational marking 260 may be provided with the main body 200 if the cover 202 is omitted.

The second alignment feature 262 may cooperate with the first alignment feature 146 of the receptacle 122 to provide a visual indication the rotational position of the hose assembly 58 as will be discussed in more detail below. The second alignment feature 262 is illustrated as being provided with the cover 202; however, it is also contemplated that the second alignment feature 262 may be partially or entirely provided with the main body 200.

Referring to FIGS. 4 and 5, the end fitting 204 may be disposed at an end of the hose assembly 58. For instance, a portion of the end fitting 204 may be encircled by the main body 200 and may be received inside the main passage 224 of the main body 200 while another portion of the end fitting 204 may protrude out of the main body 200 past the first end 220 of the main body 200. The end fitting 204 may be insertable into the receptacle 122, such as into the receptacle cavity 172 and the receptacle passage 124. A free end of the end fitting 204 may be received in the passage 134 of the rotatable fitting 106 when the hose assembly 58 is mounted to the rotatable fitting 106. In at least one configuration, the end fitting 204 may include a center portion 270 and a flange 272.

The center portion 270 may be insertable into the receptacle passage 124 and optionally the passage 134. The center portion 270 may encircle the receptacle axis 150. In at least one configuration and as is best shown in FIG. 4, the center portion 270 may include a first seal groove 280, a threaded portion 282, or both.

The first seal groove 280 may extend from an exterior side of the center portion 270 toward the receptacle axis 150. The first seal groove 280 may receive a first seal 284, such as an O-ring, that may encircle the center portion 270. The first seal 284 may be received inside of the receptacle passage 124 and may extend from the center portion 270 to the receptacle 122 to inhibit leakage between the end fitting 204 and the receptacle 122. The first seal 284 may be disposed proximate the ring 160 of the receptacle 122.

The threaded portion 282, if provided, may be disposed inside the center portion 270 and may encircle the receptacle axis 150. The threaded portion 282 may facilitate mounting of a valve assembly 206 and one or more configurations, such as the configuration shown in FIG. 9.

The flange 272 may extend radially outward from the center portion 270. As such, the flange 272 may have a larger outside diameter than the center portion 270. The flange 272 may be insertable into the receptacle cavity 172 but not the receptacle passage 124. In at least one configuration, the flange 272 may include a second seal groove 290, an end fitting recess 292, or both.

The second seal groove 290 may extend from an exterior side of the flange 272 toward the receptacle axis 150. The second seal groove 290 may receive a second seal 294, such as an O-ring, that may encircle the flange 272. The second seal 294 may be received inside of the main passage 224 of the main body 200 and may extend from the flange 272 to the first interior portion 240 of the main body 200 to inhibit leakage between the end fitting 204 and the main body 200. As such, the first interior portion 240 of the main body 200 may encircle the second seal 294. The second seal 294 may be spaced apart from and may not engage the receptacle 122.

The end fitting recess 292 may be provided in the flange 272. The end fitting recess 292 may encircle the center portion 270 and may be open in a direction that faces toward the free end of the end fitting 204. The end fitting recess 292 may be axially positioned between the first seal groove 280 and the second seal groove 290, and thus may be axially positioned between the first seal 284 and the second seal 294. The end fitting recess 292 may receive a portion of the ring 160 that extends from the receptacle bottom wall 140.

Figure 9:
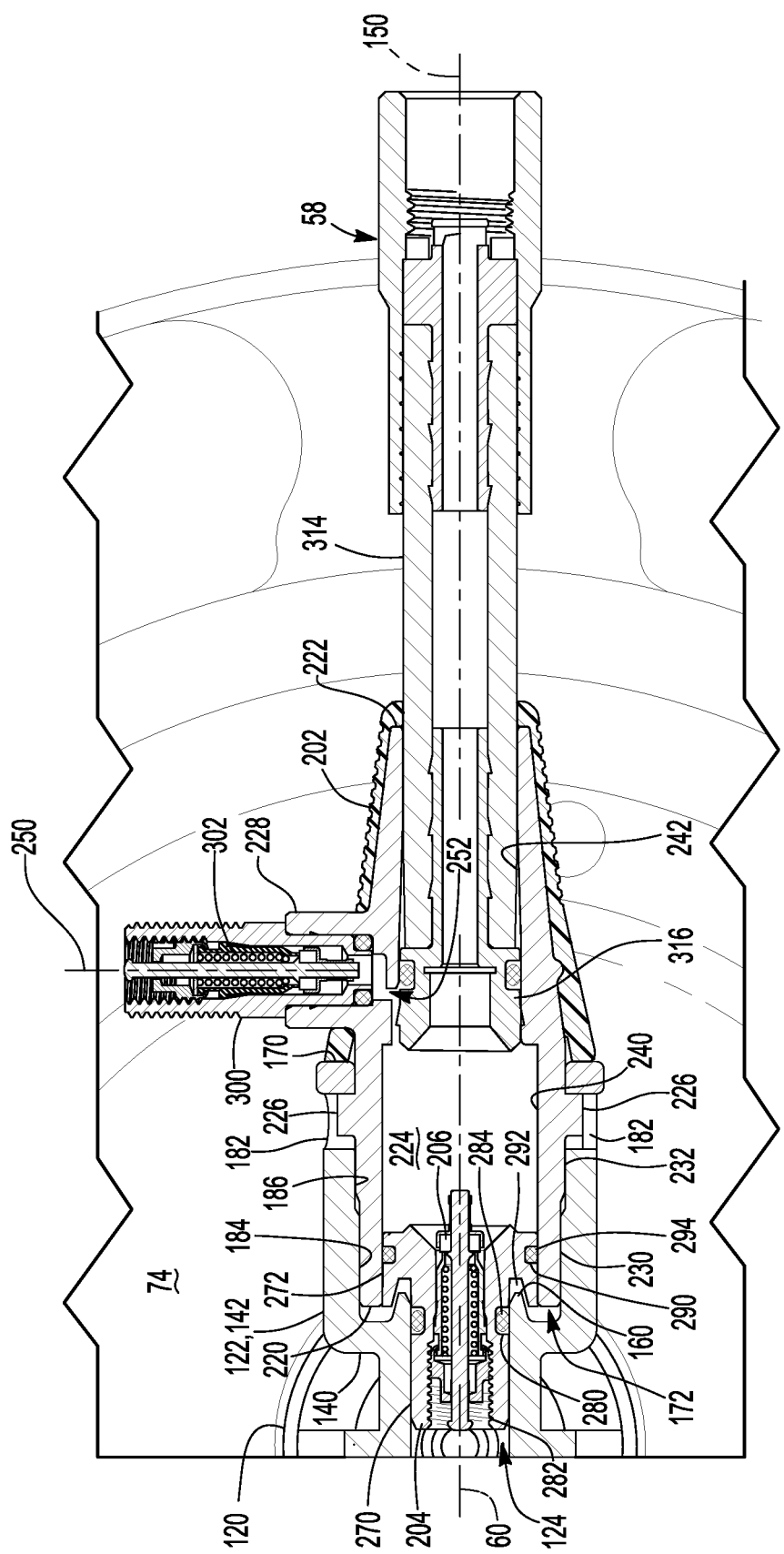
FIG. 9 is a section view along section line 4-4 that includes a second configuration of the hose assembly.

Referring to FIGS. 4, 5, and 9, the valve assembly 206 may help control the flow of pressurized gas. For instance, a valve of the valve assembly 206 may be configured to permit pressurized gas to flow through the rotary union 54 and the hose assembly 58 into a tire 22 when the supply pressure or air pressure provided to the rotary union 54 is sufficient to open the valve or keep the valve in an open position. Conversely, the valve may be configured to close when the air pressure in the tire 22 exceeds the supply pressure. The valve assembly 206 may be at least partially disposed in the main passage 224. In FIG. 4, a majority of the valve assembly 206 is axially positioned between the end fitting 204 and the hose subassembly 210. In FIG. 9, a majority of the valve assembly 206 is disposed in the end fitting 204 and may have threads that mate with threaded portion 282 of the end fitting 204. In either configuration, the valve assembly 206 may be partially disposed in the end fitting 204.

Referring to FIGS. 4 and 5, the port valve assembly 208 may be at least partially received in the port 228. The port valve assembly 208 may have any suitable configuration. For instance, in FIG. 4 the port valve assembly 208 may include a stem 300 that is mounted to the port 228 and that may receive a valve 302, such as a Schrader valve. The port valve assembly 208 may be disposed downstream of the valve assembly 206 and thus may be in fluid communication with the tire 22. As such, the port valve assembly 208 may be used to check the inflation pressure of a tire 22 and optionally adjust the pressure of the tire 22. For example, a tire gauge may be engaged with the distal end of the port valve assembly 208 to open the valve 302 and check the tire pressure. Similarly, an external supply hose may be engaged with the distal end of the port valve assembly 208 to open the valve 302 and inflate the tire 22. It is also contemplated that the valve 302 may be opened to exhaust pressurized gas.

Referring to FIG. 1, the hose subassembly 210 may be adapted to be fluidly connected to a tire 22. More specifically, the hose subassembly 210 may fluidly connect the main body 200 and a tire 22 when the hose subassembly 210 is coupled to the main body 200 and to the tire 22. The hose subassembly 210 may be provided in various configurations. In each configuration, the hose subassembly 210 may have a first end 310, which is best shown in FIGS. 4 and 5, and a second end 312. At least one hose segment 314 may be provided between the first end 310 and the second end 312.

Referring to FIGS. 4 and 5, the first end 310 may be coupled to the main body 200. For instance, the first end 310 may include a fitting 316 that may be attached to a hose segment 314 and that may be received inside of the main body 200. The first end 310 may be disposed opposite the second end 312.

Referring to FIG. 1, the second end 312 may be connectable to a tire 22. For instance, the second end may be mounted to a tire valve 320 that may extend through a hole in the wheel 30 and that may permit gas to enter or exit the tire 22 when the tire valve 320 is open. The hose assembly 58 may be configured to hold the tire valve 320 in an open position when secured to the tire valve 320. Moreover, the tire valve 320 may close when the hose assembly 58 is disengaged from the tire valve 320 to prevent deflation of the tire 22.

Referring to FIGS. 6-8, installation and removal of the hose assembly 58 will now be described. For clarity, a single hose assembly 58 is depicted in these figures. Installation may include coupling the hose assembly 58 to the rotatable fitting 106. Removal may include decoupling the hose assembly 58 from the rotatable fitting 106. As an overview, the main body 200 may be rotatable between a first rotational position and a second rotational position when the main body 200 is at least partially received in the receptacle cavity 172.

In FIG. 6, the hose assembly 58 is detached from and decoupled from the rotatable fitting 106. The hose assembly 58 may be installed by orienting the end fitting 204 toward the receptacle 122 such that the end fitting 204 is generally centered about the receptacle axis 150 and such that each locking protrusion 226 is generally rotationally aligned with corresponding groove 180 in the receptacle 122 so that the locking protrusion 226 may be inserted into the groove 180. Rotational alignment of a locking protrusion 226 and a corresponding groove 180 may occur before or after the main body 200 is engaged with the receptacle 122.

In FIG. 7, the hose assembly 58 is shown in a first rotational position with the main body 200 at least partially inserted into the receptacle cavity 172 of the receptacle 122. Each locking protrusion 226 may be received in corresponding groove 180. Depending on the configuration of the groove 180, the main body 200 may be further inserted into the receptacle 122 than is shown. For instance, the main body 200 may be advanced further without rotating the main body 200 about the receptacle axis 150 in a configuration in which the groove has an L-shaped configuration rather than a tapered configuration like that shown.

In FIG. 8, the hose assembly 58 is shown in a second rotational position. The hose assembly may be moved from the first rotational position to the second rotational position by rotating the main body 200 about the receptacle axis 150 in a first rotational direction, which is depicted as being a clockwise direction from the perspective shown. Rotating the main body 200 in the first rotational direction may cause the locking protrusion 226 to cooperate with the groove 180 to allow the main body 200 to advance along the receptacle axis 150 toward the axis 60 when the groove 180 spirals or twists along its length. The main body 200 may be rotatable in the first direction until the locking protrusion 226 enters the locking opening 182 and the locking protrusion 226 contacts the end of the groove 180 or the locking opening 182. As such, the locking protrusion 226 may be received in the locking opening 182 to secure the main body 200 to the receptacle 122 in the second rotational position.

It is contemplated that the locking protrusion 226 may be compressed toward the receptacle axis 150 by the receptacle wall 142 when in the groove 180 and may move away from the receptacle axis 150 when the locking protrusion 226 enters the locking opening 182. Such a configuration may inhibit rotation of the main body 200 in a second rotational direction that is opposite the first rotational direction unless sufficient force is applied, the locking protrusion 226 is depressed toward the receptacle axis 150, or both.

The second alignment feature 262 of the hose assembly 58 may be aligned with the first alignment feature 146 of the rotatable fitting 106 when the main body 200 is in the second rotational position to provide a visual indication that the main body 200 is in the second rotational position.

The second rotational position may be configured to place the hose assembly 58 in a predetermined position or alignment with other components of the axle assembly 10. For instance, the port 228 may be aligned with the hub cap 74 so that the port 228 is accessible for use and not positioned in an orientation in which the port 228 may be more susceptible to damage, such being oriented generally parallel to the axis 60. As is best shown in FIG. 3, the port 228 may be aligned with the hub cap 74 and oriented in a substantially vertical orientation (e.g., within ±5° of vertical when the axis 60 is in a horizontal plane) when aligned with the hub cap in the second rotational position. For example, the port axis 250 may be substantially perpendicular to the axis 60 and may not intersect the axis 60 when the main body 200 is in the second rotational position. In addition, the hose assembly 58 may be completely spaced apart from the hub cap 74 in the second rotational position to inhibit the hose assembly from wear or potential damage.

The hose assembly 58 may be removed or disengaged from the rotary union 54 by rotating the main body 200 in the second rotational direction to the first rotational position and then moving the main body 200 along the receptacle axis 150 out of the receptacle 122. As such, the main body 200 may be insertable into the receptacle cavity 172 and may be removable from the receptacle cavity 172 when in the first rotational position.

The configurations described above may allow a hose assembly to be quickly and reliably attached to a rotary union without the use of a threaded fitting or threaded connection between the hose assembly and the rotary union. Such a threaded connection can be misaligned or overtightened, which may damage the hose assembly, the rotatable fitting, or both. Moreover, a threaded fitting or threaded connection is susceptible to under tightening, which may result in a leak. The present invention allows the rotational orientation of the port to be controlled in a reliable and repeatable manner to facilitate port access and avoid potential port damage by locating the port in a predetermined or predefined orientation when in the second rotational position. In contrast, the port may be oriented at any rotational position with a threaded connection. Controlling the orientation of the port may also help prevent the hose assembly from contacting the hub cap or associated wheel end components, which may help reduce noise and wear that may occur when the hose assembly rubs or vibrates against such components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A connection arrangement for a tire inflation system, the connection arrangement comprising:
a rotary union that comprises a rotatable fitting that is rotatable about an axis with a hub cap and that includes:

a mounting portion that is mountable to the hub cap; and a receptacle that is fluidly connected to the mounting portion, the receptacle including:
 a receptacle wall that extends away from the mounting portion and extends around a receptacle axis to define a receptacle cavity; and
 a locking opening that is provided in the receptacle wall; and a hose assembly that includes:
 a main body that is receivable in the receptacle cavity, wherein the main body comprises a first end, a second end, a main passage that extends from the first end to the second end, a locking protrusion that is disposed opposite the main passage and extends away from the main passage, and a port that extends along a port axis and is fluidly connected to the main passage;
 a hose that is coupled to the main body and adapted to be fluidly connected to a tire; and
 a cover that extends around the main body, encircles the port, and extends from the second end toward the first end;

wherein the main body is rotatable between a first rotational position and a second rotational position when the main body is received in the receptacle cavity, the main body being insertable into and removeable from the receptacle cavity in the first rotational position, and the locking protrusion being received in the locking opening to secure the main body to the receptacle in the second rotational position, and wherein the receptacle comprises a first alignment feature that is disposed adjacent to the locking opening and the cover comprises a second alignment feature that is aligned with the first alignment feature when the main body is in the second rotational position.

2. The connection arrangement of claim 1 wherein the locking opening is generally D shaped.

3. The connection arrangement of claim 1 wherein the main body comprises a port passage that extends axially from the port toward the first end and is a recess that extends toward the receptacle axis.

4. A connection arrangement for a tire inflation system, the connection arrangement comprising:
 a rotary union that comprises a rotatable fitting that is rotatable about an axis with a hub cap and that includes:
  a mounting portion that is mountable to the hub cap; and
  a receptacle that is fluidly connected to the mounting portion, the receptacle including:
   a receptacle wall that extends away from the mounting portion and extends around a receptacle axis to define a receptacle cavity;
   a receptacle passage that fluidly connects the mounting portion to the receptacle cavity; and
   a locking opening that is provided in the receptacle wall; and
 a hose assembly that includes:
  a main body that is receivable in the receptacle cavity, wherein the main body comprises a first end, a second end, a main passage that extends from the first end to the second end, a locking protrusion that is disposed opposite the main passage and extends away from the main passage, and a port that extends along a port axis and is fluidly connected to the main passage;
  a hose that is coupled to the main body and adapted to be fluidly connected to a tire; and
  an end fitting that is partially received inside the main passage and that protrudes from the first end of the main body into the receptacle passage, wherein the main body is rotatable between a first rotational position and a second rotational position when the main body is received in the receptacle cavity, the main body being insertable into and removeable from the receptacle cavity in the first rotational position, and the locking protrusion being received in the locking opening to secure the main body to the receptacle in the second rotational position.

5. The connection arrangement of claim 4 wherein the port is oriented in a substantially vertical orientation when aligned with the hub cap in the second rotational position.

6. The connection arrangement of claim 4 wherein the hose assembly is completely spaced apart from the hub cap in the second rotational position.

7. The connection arrangement of claim 4 wherein the port axis is disposed substantially perpendicular to the receptacle axis and intersects the receptacle axis, and the receptacle axis and the port axis are disposed substantially perpendicular to the axis when the main body is in the second rotational position.

8. The connection arrangement of claim 4 wherein the receptacle wall extends away from the mounting portion to a receptacle wall end surface and defines a groove that extends from the receptacle wall end surface to the locking opening.

9. The connection arrangement of claim 8 wherein the groove is tapered such that the groove becomes narrower as the groove extends from the receptacle wall end surface to the locking opening.

10. The connection arrangement of claim 4 wherein the hose assembly further comprises a cover that extends around the main body, encircles the port, and extends from the second end toward the first end.

11. The connection arrangement of claim 4 wherein the receptacle comprises a first alignment feature is disposed adjacent to the locking opening and the hose assembly further comprises a cover that comprises a second alignment feature that is aligned with the first alignment feature when the main body is in the second rotational position.

12. The connection arrangement of claim 4 wherein a valve assembly is disposed in the main passage and is axially positioned between the end fitting and the hose.

13. The connection arrangement of claim 12 wherein the valve assembly is partially disposed in the end fitting.

14. The connection arrangement of claim 4 wherein a valve assembly is disposed in and is mounted to the end fitting.

15. A connection arrangement for a tire inflation system, the connection arrangement comprising:
 a rotary union that comprises a rotatable fitting that is rotatable about an axis with a hub cap and that includes:
  a mounting portion that is mountable to the hub cap; and
  a receptacle that is fluidly connected to the mounting portion, the receptacle including:
   a receptacle wall that extends away from the mounting portion and extends around a receptacle axis to define a receptacle cavity;
   a receptacle passage that fluidly connects the mounting portion to the receptacle; and
   a locking opening that is provided in the receptacle wall; and a hose assembly that includes:
- a main body that is receivable in the receptacle cavity, wherein the main body comprises a first end, a second end, a main passage that extends from the first end to the second end, a locking protrusion that is disposed opposite the main passage and extends away from the main passage, and a port that extends along a port axis and is fluidly connected to the main passage;
- a hose that is coupled to the main body and adapted to be fluidly connected to a tire; and
- an end fitting that is partially received inside the main passage and that protrudes from the first end of the main body into the receptacle passage;

wherein the main body is rotatable between a first rotational position and a second rotational position when the main body is received in the receptacle cavity, the main body being insertable into and removeable from the receptacle cavity in the first rotational position, and the locking protrusion being received in the locking opening to secure the main body to the receptacle in the second rotational position; and wherein the receptacle comprises a receptacle bottom wall that extends from the receptacle wall toward the receptacle axis and a ring that extends around the receptacle axis and that protrudes from the receptacle bottom wall toward the second end, wherein the ring is partially received in the end fitting.

16. The connection arrangement of claim 15 wherein a first seal encircles the end fitting and extends from the end fitting to the receptacle proximate the ring.

17. The connection arrangement of claim 16 wherein a second seal encircles the end fitting and extends from the end fitting to the main body such that the main body encircles the second seal.

18. The connection arrangement of claim 17 wherein the end fitting comprises an end fitting recess that receives the ring and the end fitting recess is axially positioned between the first seal and the second seal.

19. The connection arrangement of claim 15 wherein the receptacle wall extends away from the mounting portion to a receptacle wall end surface and defines a first inside portion that extends from the receptacle bottom wall and a second inside portion that extends between the first inside portion and the receptacle wall end surface, and the main body comprises a first outside portion that extends from the first end and is at least partially received in the first inside portion and a second outside portion that extends between the first outside portion and the second end and that is at least partially received in the second inside portion.

20. The connection arrangement of claim 19 wherein the second outside portion extends between the first outside portion and the port.

* * * * *